United States Patent
Gipson et al.

(10) Patent No.: US 6,778,512 B2
(45) Date of Patent: Aug. 17, 2004

(54) COMMUNICATION SYSTEM THAT PROVIDES EXTRA PROTECTION WHEN TRANSMITTING CRITICAL DATA

(75) Inventors: Jack Anthony Gipson, Fort Worth, TX (US); Liang Li, Lewisville, TX (US); Rajesh Nakkana, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 153 days.

(21) Appl. No.: 09/745,141

(22) Filed: Dec. 20, 2000

(65) Prior Publication Data

US 2002/0075893 A1 Jun. 20, 2002

(51) Int. Cl.$^7$ ................................................ H04Q 7/00
(52) U.S. Cl. ........................ 370/330; 370/337; 370/343; 370/345; 370/436; 370/458; 370/468; 455/62; 455/63; 455/447
(58) Field of Search ........................ 370/310, 328–329, 370/330, 337, 343, 345, 347, 436, 442, 458, 465, 468; 455/447, 73, 524, 63, 62

(56) References Cited

U.S. PATENT DOCUMENTS

| | | | |
|---|---|---|---|
| 5,485,463 A | * | 1/1996 | Godoroja ................. 370/333 |
| 6,038,455 A | | 3/2000 | Gardner et al. |
| 6,137,787 A | * | 10/2000 | Chawla et al. ............. 455/447 |
| 6,188,903 B1 | * | 2/2001 | Gardner et al. ............. 370/330 |

* cited by examiner

Primary Examiner—Dang Ton
Assistant Examiner—Inder Pal Mehra
(74) Attorney, Agent, or Firm—Charles W. Bethards; Hisashi D. Watanabe

(57) ABSTRACT

According to the present invention, different frequency reuse patterns are used when scheduling critical and non-critical data transmissions. More specifically, the present invention uses a first reuse pattern for scheduling the transmission of critical data and a second reuse pattern for scheduling the transmission of non-critical data. The invention can be applied to any inbound or outbound time slotted protocol that have message fragments spanning over one or more time slots. The reuse pattern can be varied slot by slot, to use a less aggressive reuse for communicating critical data and a more aggressive reuse for communicating non-critical data. As a result, data can be communicated more reliably and throughput can be increased by protecting critical data transmissions via a less aggressive reuse.

7 Claims, 4 Drawing Sheets

COMMUNICATION SYSTEM THAT PROVIDES EXTRA PROTECTION WHEN TRANSMITTING CRITICAL DATA

FIELD OF THE INVENTION

In general, the present invention relates to the field of communication systems and more particularly, to a communication system that transmits data during repetitive time slots.

BACKGROUND OF THE INVENTION

In known two-way radio frequency communication networks, a number of transmitter units are used to transmit messages on outbound radio frequency (RF) channels to mobile communication units, for example, two-way pagers, cellular telephones, radios, etc. One or more receivers are associated with each transmitter for receiving messages from mobile communication units on inbound RF channels.

Various paging protocols are used for one-way and two-way paging. For example, the FLEX technology developed by Motorola Inc., the assignee of the present invention, organizes the message into frames of data or a specific sized packet containing bits of data. FLEX and ReFLEX protocols, which specify a one-way and a two-way protocol, respectively, are adopted by many paging service providers worldwide. These protocols are multi-speed, high-performance paging protocols. The protocols are based on a "synchronous" time slot protocol, which is designed to increase the battery life of the pagers. Instead of sending out messages at random, all paging data intended for a particular pager is scheduled into a pre-defined time slot for transmission.

There are a total of 128 frames in a FLEX protocol system numbered zero through 127. The frames are transmitted at 32 frames per minute, and thus a full 128-frame cycle lasts four (4) minutes. This arrangement allows a FLEX-based pager to selectively decode one or more frames over each four minute FLEX cycle, so that the pager does not need to waste its battery life decoding data intended for other pagers.

Many selective messaging systems, such as paging systems, are simulcast systems where a message is simultaneously or nearly simultaneously launched from each or all transmitters in a system over outbound channels. These simulcast systems provide excellent coverage in that a mobile communication units is very likely to receive any message intended for the device, regardless of the location of the device or lack of knowledge on the part of the system of its location. The system also includes receivers that receive inbound message traffic transmitted from the mobile communication units.

As a part of the ReFLEX protocol, certain time slots within a frame carry critical fragments of messages that can be lost due to co-channel interference. One such critical fragment is the "Start Address Unit Response" message, which is transmitted by a mobile communication unit as the first packet of a multi-packet scheduled inbound message. The Start Address Unit Response contains data that specifies the length of inbound messages. The mobile communication unit transmits the Start Address Unit Response in response to an outbound Schedule Inbound message command from the system. If the Start Address Unit Response is lost or received in error, all of the following inbound packets, i.e., packets transmitted from the mobile communication units to the system, can not be received correctly, because the system does not know the number of remaining fragments.

Co-channel interference is one of the factors contributing to loss of data in a communication system or device. In order to lower co-channel interference, various techniques have been used to achieve frequency reuse. Under one approach, a number of different RF channels are assigned neighboring coverage areas, or cells. Because of the relatively low power RF transmissions within a particular cell, another cell spaced two or more cells apart may typically reuse the same frequency, in accordance with a frequency reuse pattern. The farther the cells reusing the same frequencies are from each other; the less aggressive the reuse pattern is considered to be. On the other hand, the closer the cells reusing the same frequency are to each other, the more aggressive the reuse pattern is considered. The more aggressive the reuse patterns the higher the achievable data rate and the higher the risk of co-channel interference, and vice versa.

FIGS. 1 and 2 are diagrams of a plurality of cells employing frequency reuse patterns. FIG. 1 illustrates a frequency reuse pattern with a seven-cell cluster. If, for example, the two-way messaging system has twenty-one communication frequencies and each cell utilizes all time slots, then each cell would utilize three unique frequencies. Conversely, another system could utilize, for example, a single frequency and seven non-overlapping time slots, each of the seven time slots being uniquely assigned to each of the seven cells. Other combinations are possible, so long as each cell communicates on either a different frequency or a different time slot from that used by any other cell. As the seven-cell clusters are repeated throughout the communication system, each cell is susceptible to several sources of communication interference.

As described before, these sources include co-frequency (or co-channel) interference, and adjacent channel interference. Multiple cells outside of the seven-cell cluster utilizing the same communication frequency cause co-channel interference. The communication system is designed to place cells utilizing the same communication frequency as far apart as allowed by the frequency reuse pattern. Adjacent channel interference occurs from communication frequencies that are adjacent to each other in the frequency spectrum. The final form of interference always present in the two-way messaging system is noise inherent in transmitters, receivers, and mobile communication units.

Changing the frequency reuse pattern to increase the frequency reuse distance can reduce co-channel and adjacent channel interference. For example, FIG. 2 illustrates a frequency reuse pattern including twelve-cell clusters. In a two-way messaging system utilizing twenty-one communication frequencies, each cell could simultaneously use an average of 1.75 frequencies. The change in the frequency reuse pattern reduces the system capacity by approximately 42 percent. However, the distance between cells simultaneously utilizing the same communication frequencies has been increased, thereby reducing co-channel interference. In addition, since there are fewer frequencies present within each cell, adjacent channel interference is reduced. By increasing the frequency reuse distance, the coverage range and reliability of the transmitters and receivers in each cell is increased.

Under an inbound frequency reuse approach, a group of receivers receive messages from a transmitter within a coverage area, where the transmitter can be scheduled to transmit data during times that may or may not overlap with each other. If an aggressive reuse is used, the chances are higher for reception of simultaneously transmitted messages at a larger number of receivers that cover a reception footprint. More aggressive reuse, however, may result in co-channel interference that reduces the chances of decoding data, including critical data, correctly.

Thus, if an aggressive reuse is used, i.e., when multiple mobile communicators transmit on the same frequency at the same time, enough co-channel interference can be caused that results in loss of data. This is a known risk of reusing the frequency for simultaneous transmissions. In the case of scheduling a single or a small number of packets, this is worth the risk, mainly because the requirement for retransmission and recovery of a small amount of erroneously received or lost data is manageable. But in long data transmissions, for example 115 packets, if a packet that contains critical data is lost, all of the 115 packets become unrecoverable. The requirement for retransmission or recovery of such a large amount of erroneously received or lost data can degrade the overall system throughput and performance.

Therefore, there exists a need to improve system performance by reducing data loss due to frequency reuse on a time slot by time slot basis.

DETAILED DESCRIPTION OF THE PREFERRED EMBODIMENT

According to the present invention, different times and/or frequencies are used when scheduling critical and non-critical data transmissions. More specifically, according to the present invention of a first reuse pattern is used for scheduling the transmission of critical data and a second reuse pattern is used for scheduling the transmission of non-critical data. The invention can be applied to any inbound or outbound time slotted protocol that has message fragments spanning over one or more time slots. The reuse pattern can be varied slot by slot, to use a less aggressive reuse pattern for communicating critical data and a more aggressive reuse pattern for communicating non-critical data. As a result, data can be communicated more reliably by protecting critical data transmissions via a less aggressive reuse pattern.

A communication device according to the present invention communicates data during repetitive time slots. The communication device includes a controller that schedules data transmissions during the repetitive time slots. A transmitter transmits critical data based on the first reuse pattern during a first time slot and communicates non-critical data based on the second reuse pattern during a second time slot.

Figure 3:
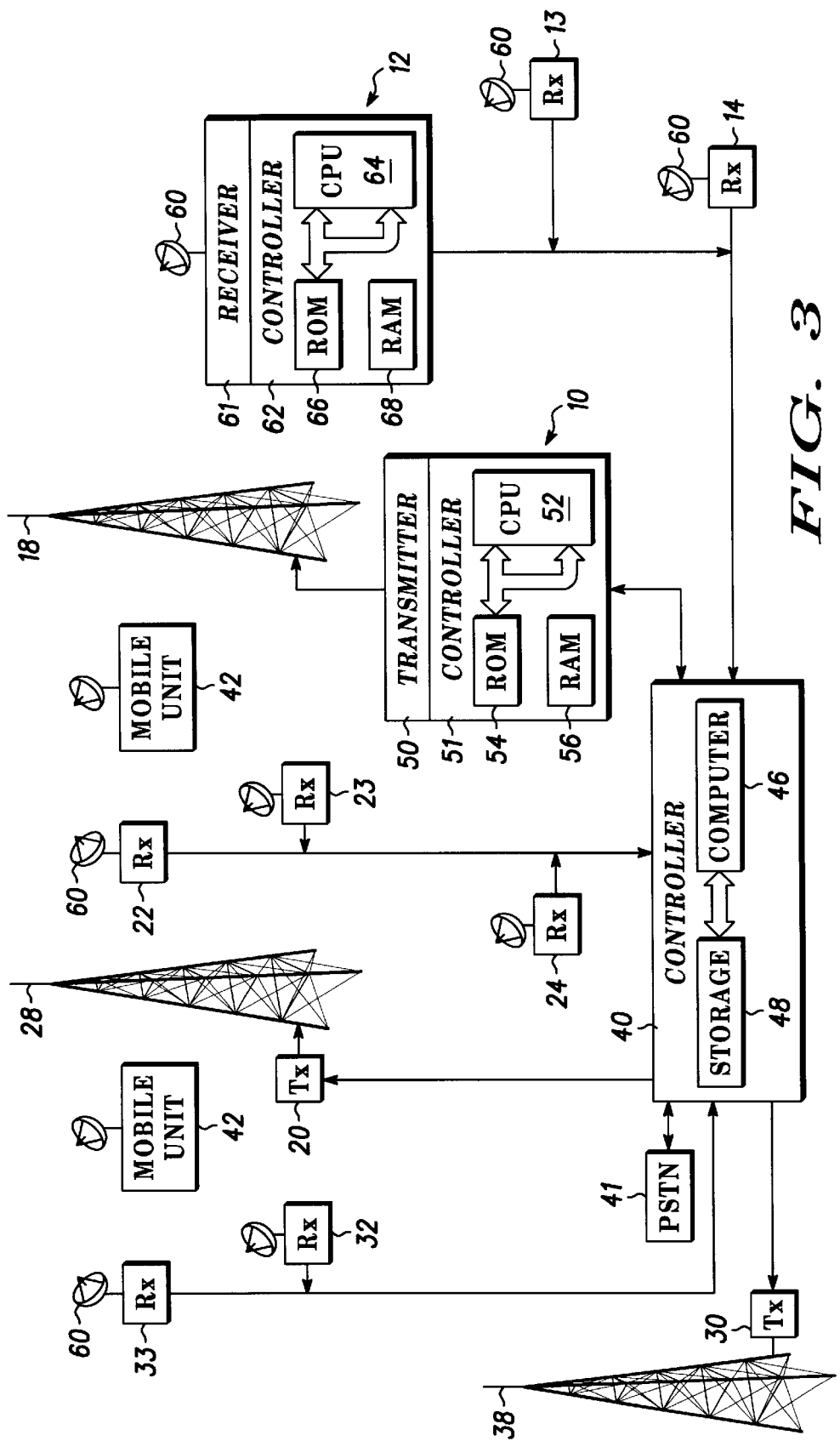
FIG. 3 is a block diagram of a system that advantageously utilizes the present invention.

Referring to FIG. 3, a block diagram of an exemplary system according to the present invention includes a number of transmitter units 10, 20, 30 and receiver units 12–14, 22–24 and 32–33. The transmitters and receivers are coupled to a controller 40 that schedules communications, i.e., transmissions or receptions, of data during the repetitive time slots. For example, the controller 40 assigns frequency channels and schedules time slots for data transmissions to one or more mobile communication units 42. Exemplary mobile communication units 42 include mobile radios, cellular telephones, pagers, etc.

In accordance with an exemplary embodiment, the system of FIG. 3 is a ReFLEX system offered by Motorola, Inc., the assignee of the present invention. In such system, the mobile communication units 42 are instructed to access inbound channels through BIWs (Block Information Words) and vectors, which are typically used to address and command the mobile communication units 42. A ReFLEX frame structure has a synchronization portion, a block information field (BIF) preferably containing a frame information word, a Block information word (BIW), and a cyclic redundancy check (CRC) within the BIF. The CRC is used for bit error detection in the received BIW. An address field within an address portion follows the CRC and provides address information to the mobile communication units 42 on a control channel. The address field points to a corresponding vector within a vector portion. The vector generally contains control information for a mobile communication unit 42 regarding the location of a forward channel and the location of the message in a frame. For instance, a vector may contain a pointer that points to a message in the message field within an outbound message portion. In the ReFLEX protocol, the vector also contains inbound channel scheduling information regarding a mobile communication unit's transmission of an acknowledgment response. The vector may also contain scheduling and control information for a mobile communication unit 42 initiating a transmission on the inbound channel, such as the Start Address Unit Response, which is transmitted during the first time slot of a multislot data transmission.

Periodically, the system can send a special forward message to the mobile communication units 42, using a global address. This message is used to inform the mobile communication units 42 about system configuration. A BIW can preferably include information about modulation schemes (4 Level FSK, Spread Spectrum, QAM, FLEX, POCSAG, etc.), a boundary between scheduled and unscheduled slotted (ALOHA) transmissions, the maximum number of ALOHA retries allowed by the subscriber unit, the inbound (or reverse) channel speeds, the randomization interval for ALOHA transmissions, the ALOHA time out period, power levels, and many other communication parameters including but not limited to spread spectrum parameters such as hopping sequences, spreading gain or hopping frequencies.

Figure 4A:
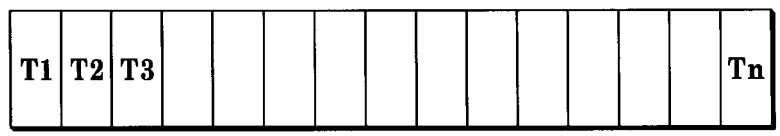
FIGS. 4(a)–4(c) are timing diagrams for transmission of data in the system of FIG. 3.
Figure 4B:
Figure 4C:
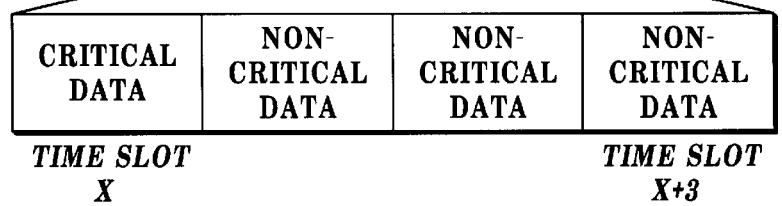

FIG. 4(a) shows a diagram of data packets divided into time slots T1–Tn, which are used for communicating critical and non-critical data messages. FIG. 4(b) shows the time slots being grouped to form fragments 1, 2 and 3. As shown in FIG. 4(c), each fragment includes a critical data portion followed by non-critical data portions. In an exemplary embodiment, the Start Address Unit Response contains critical data relating to the packet length or the number of subsequent packets that carry data in a scheduled transmission. As stated before, the loss of Start Address Unit Response due to co-channel interference for example can significantly reduce data throughput, because the system cannot accurately receive the remaining portion of the messages. Using a less aggressive reuse pattern, which reduces the chances of collision of transmitted critical data, the present invention protects the critical data, for example, those contained in the Start Address Unit Response. In addition to employing a less aggressive time reuse on inbound data, the present invention can also be applied to outbound data. In this way, the system can reach a higher rate of successful inbound and outbound transmissions, without substantially reducing reuse.

Referring back to FIG. 3, in an exemplary communication application, the controller 40 receives input messages, for example, page initiation messages, from a PSTN 41 or the like. The controller 40 includes a processor that operates in accordance with software and data stored in a memory for generating messages in accordance with a particular signaling protocol, for example, a four-level FSK signal protocol, such as REFLEX. The controller 40 schedules the transmission of the message over an outbound channel. Each of the transmitter units 10, 20, 30 of the network are positioned to maximize the area covered by message transmissions and to assure good signal quality.

Each of the transmitter units 10, 20, 30 includes a transmitter 50 and controller 51 as shown for the transmitter unit 10. The controller 51 of the transmitter unit includes a central processing unit (CPU) 52 that operates in accordance with software, preferably, stored in a read only or programmable read only type of memory 54 and data stored in a random access type of memory 56 in order to control the operations of the transmitter unit 10, 20, 30. A queue that may be formed in a portion of the memory 56 of the transmitter unit 10, 20, 30 stores messages that are scheduled for transmission over an assigned outbound channel. The transmitter unit 10, 20, 30 transmits a message via a respective antenna 18, 28, 38 for reception by the mobile communication units 42 in accordance with an identification of the units that are included in the transmitted messages.

The receiver units 12–14, 22–24 and 32–33 of the network receive inbound message traffic transmitted from the mobile communication units 42 over inbound channels. Each of the receiver units as shown for the receiver unit 12 includes an antenna 60 for receiving messages transmitted from the mobile communication units 42 as well as a receiver 61 and controller 62 for demodulating and decoding the received data. The controller 62 of each of the receiver units includes a central processing unit 64 that operates in accordance with software stored in a, preferably, programmable read only type of memory 66 and data stored in a random access type of memory 68.

In order to perform the functions necessary for controlling operations of the system in accordance with the present invention, the controller 40 preferably includes a conventional computer system 46, and a conventional mass storage medium 48. The conventional mass storage medium 48 includes, for example, a subscriber database, comprising subscriber user information such as addressing and programming options of the mobile communication units 42. The conventional computer system is preferably programmed by way of software included in the conventional mass storage medium 48 for performing the operations and features required in accordance with the present invention. It will be appreciated that other types of conventional computer systems can be utilized, and that additional computer systems and mass storage media of the same or alternative type can be added as required to handle the processing requirements of the system.

The storage medium 48 preferably includes software and various databases. In particular, the storage medium 48 includes a message scheduling, antenna control, and frequency reuse element which causes the controller 40 to schedule transmission and reception of messages in accordance with the present invention. It will be appreciated that the controller 40 and any transceiver comprising one or more receivers and transmitters can be either collocated or remote from one another, depending upon system size and architecture. It will be further appreciated that in large systems functional elements of the controller 40 can be distributed among a plurality of networked controllers. For example, the message scheduling, antenna control, and frequency reuse element can be located in one or more output controllers located near the transceivers, while the subscriber database can be kept in a controller at a central location.

Figure 5:
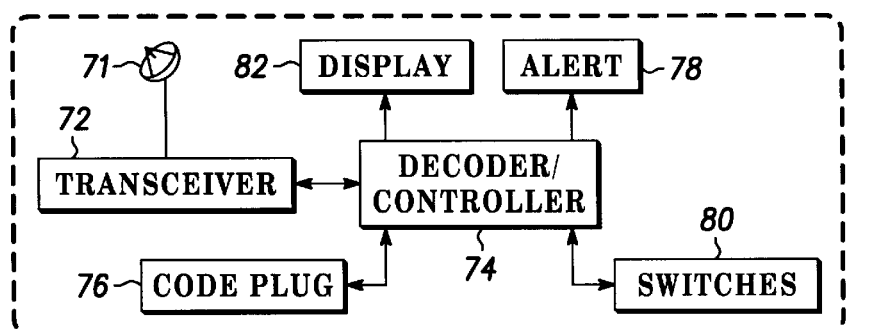
FIG. 5 is a block diagram of a mobile communication unit in accordance with the present invention that is used in the system of FIG. 3.

Referring to FIG. 5, a block diagram of the mobile communication units 42, which is depicted in an exemplary form as a two-way selective call pager 70. The pager 70 includes an antenna 71 for receiving transmitted messages over outbound channels and for transmitting messages over one or more inbound channels. The antenna 71 couples a received signal to a transceiver 72 wherein the transceiver 72 produces a data stream representative of a demodulated received signal that is coupled to a decoder/controller 74. The transceiver 72 is also responsive to a modulation input such as data received from the decoder/controller 74 to frequency modulate a carrier signal for transmission out from the pager 70 to the receivers 12–14, 22–24 and 32–33 over the inbound channels. As is well known in the art, the decoder/controller 74 may include a central processing unit such as a microprocessor or the like for processing demodulated signal information in accordance with software stored in a memory of the decoder/controller 74. The decoder/controller 74 is also responsive to inputs from one or more switches 80 or other input devices to generate data that is coupled to the transceiver 72 for transmission out from the pager 70. The RF signals transmitted by the transmitter units 10, 20, and 30 typically include an address that identifies a particular pager 70 as well as an associated alphanumeric and/or voice message. The decoder/controller 74 decodes a received address by comparing it with one or more addresses stored in a code plug or code memory 76. If the decoder/controller 74 detects a match between a received address and a stored address, an alert device 78 alerts a user that the pager 70 has received a message by generating an alert signal. The alert signal may be an audible, visual, and/or a tactile alert such as a silent vibrating alert. The switches 80 may be actuated by a user to select between the different types of alert's as well as for causing a message stored in the memory of the decoder/controller 74 to be accessed for display on a display 82. The switches 80 may also provide additional functions such as reset, read, delete, etc. as is well known.

Figure 1:
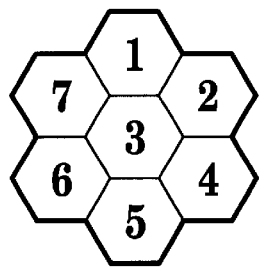
FIG. 1 is one diagram of a known reuse pattern.
Figure 2:
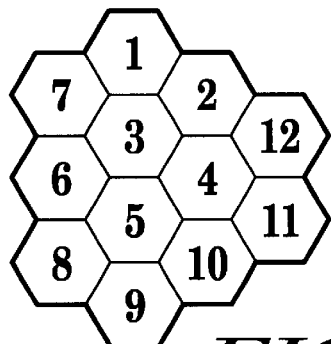
FIG. 2 is another diagram of a known reuse pattern
Figure 6:
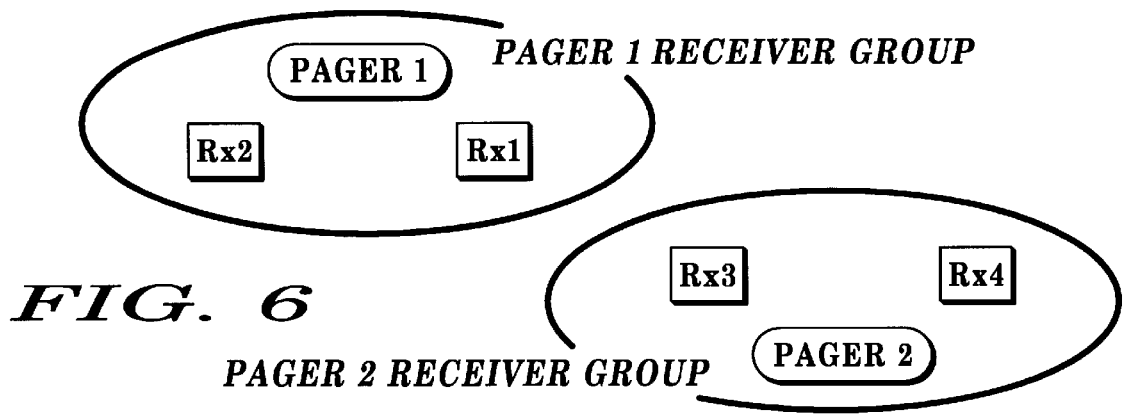
FIG. 6 is a diagram depicting reception footprints of two pagers.

FIG. 6 shows reception footprints for two mobile communication units 42 that are shown as Pager 1 and Pager 2. As shown, Pager 1 transmitted messages are best received by a receiver group comprising receivers Rx1 and Rx2, which can be two of the receivers shown in FIG. 1. Because the receivers Rx1 and Rx2 provide the best received signal quality for Pager1, they form a receiver group or "clique", with a corresponding reception footprint. Similarly, a receiver group comprising receivers Rx3 and Rx4 best receives the Pager 2 messages. Of course if any receiver is included or removed from a receiver group, the reception foot print changes. As a result, based on the received signal quality from any number of receivers, the controller 40 can approximate the position of a Pager to some degree of accuracy.

In an aggressive reuse, the controller 40 schedules the Pagers 1 and 2 to transmit data during the same time slot. As a result, all of the receivers Rx1, Rx2, Rx3 and Rx4 may receive interfering signals. In other words, if an aggressive inbound or outbound reuse is used for transmitting scheduled messages at the same time, one or more transmitters may cause enough interference that could result in loss of transmitted data.

Figure 7:
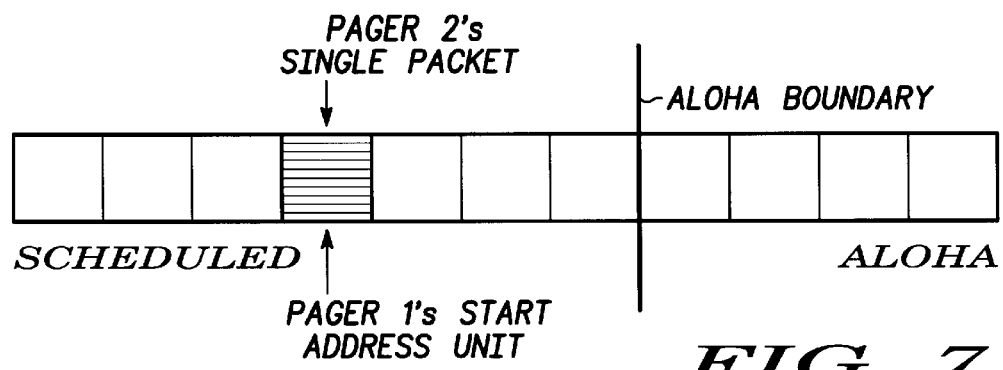
FIG. 7 is a timing diagram of a first time reuse.
Figure 8:
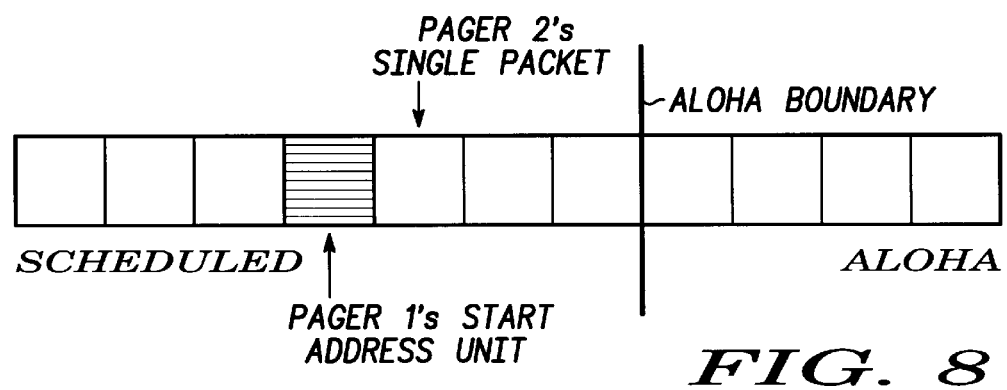
FIG. 8 is a timing diagram of a second time reuse.

For example, as shown in FIG. 7, if Pager 1 is scheduled to transmit an inbound Start Address Unit Response message, which is in response to an outbound Schedule Inbound Message command, at the same time as Pager 2 is scheduled to transmit a single packet, the Start Address Unit Response message may be lost due to co-channel interference. According to the present invention, the aggressiveness of reuse is varied based on the importance of data. As shown in FIG. 8, using a less aggressive reuse, extra protection is given during transmission of the Start Address Unit Response, when scheduling inbound data transmissions during the first packet of a series of inbound packets. As shown in FIG. 8, the Start Address Unit Response from Pager 1 is scheduled for transmission during a first time slot, while the single packet from Pager 2 is not scheduled for transmission during the same time slot. Rather, the single packet transmission from Pager 2 is scheduled for transmission during a second time slot, which may occur sooner or later than the first time slot.

Figure 9:
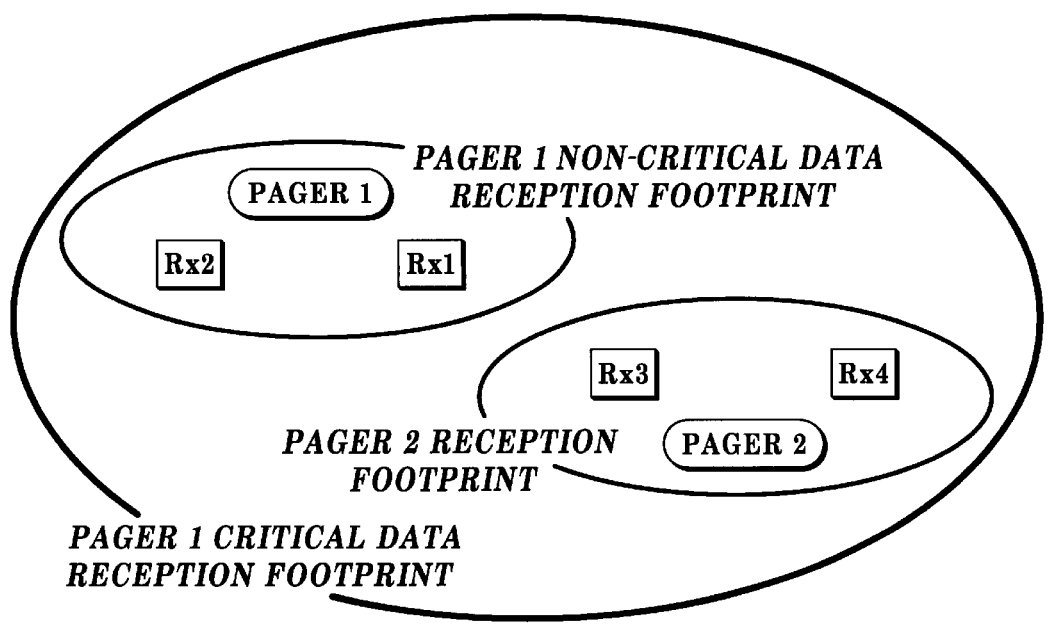
FIG. 9 is a reception foot print for the second time reuse.

FIG. 9 shows an outer circle that illustrates the reception footprint for receiving critical data, i.e., during the first time slot. The reception footprint is substantially enlarged by a less aggressive inbound reuse. However, for the remaining non-critical data where a more aggressive inbound reuse is used, the reception footprint for receiving the non-critical data is reduced. One ordinarily skilled in the art would appreciate that the present invention can be used to improve data throughput on inbound channels as well as outbound channels, where the transmitters 10–30 may be scheduled to use less aggressive reuse for transmitting critical data, to improve outbound communication throughput.

From the foregoing description, it will be appreciated that the present invention improves data throughput by protecting such critical data as the Start Address Unit Response, which allows the system to receive subsequent data messages. For long messages, the present invention reduces the risk of non-recovery of transmitted data due to loss of critical data. As a result, large amount of data does not have to be retransmitted. Moreover, the present invention can be applied based on satisfaction of a data length threshold. That is, less aggressive reuse can be used only for long data transmissions.

What is claimed:

1. A method for communicating data based on frequency reuse by a plurality of transmitters, comprising:

identifying critical and non-critical data;

transmitting the critical data using a first reuse pattern in response to identifying the critical data; and transmitting the non-critical data using a second reuse pattern in response to identifying the non-critical data, wherein the first reuse pattern is less aggressive than the second reuse pattern.

2. The method of claim 1, wherein:

the critical data is transmitted from one transmitter during a first time slot; and the non-critical data is transmitted from another transmitter during a second time slot.

3. The method of claim 1, wherein the critical data comprises data the loss of which makes subsequent data transmissions from a transmitter unrecoverable.

4. The method of claim 1, wherein the first reuse pattern for critical data is applied, if a length of a data transmission satisfies a length threshold.

5. The method of claim 4, wherein critical data is transmitted using the first reuse pattern for long data transmissions.

6. The method of claim 1, wherein the critical data is transmitted over an inbound channel.

7. The method of claim 1, wherein the critical data is transmitted over an outbound channel.

* * * * *